June 25, 1929.  C. J. KORNDORFER ET AL  1,718,743
PAPER SUPPLY MEANS FOR RECORDING INSTRUMENTS
Filed July 21, 1927  3 Sheets-Sheet 2
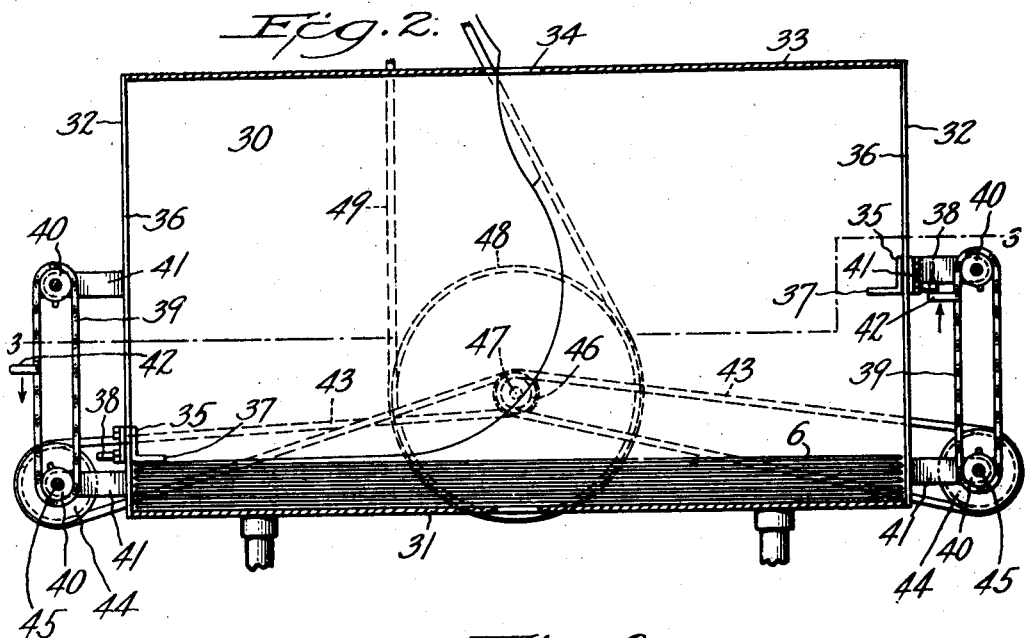
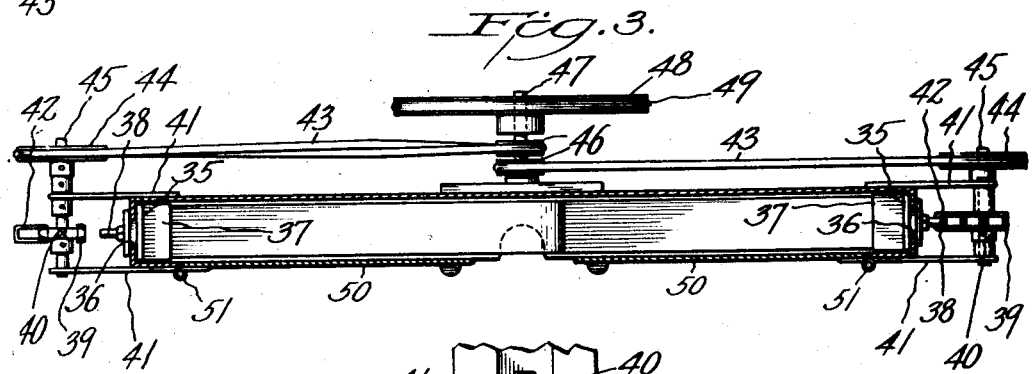
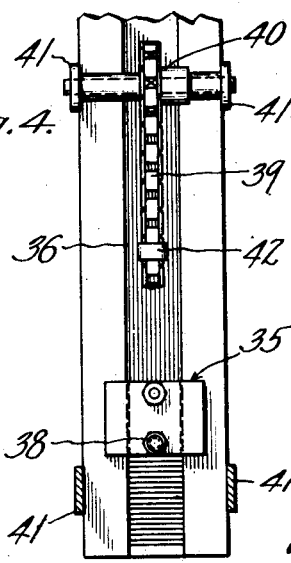
INVENTORS
CASPAR J. KORNDORFER
LESLIE T. HAND
BY
ATTORNEY

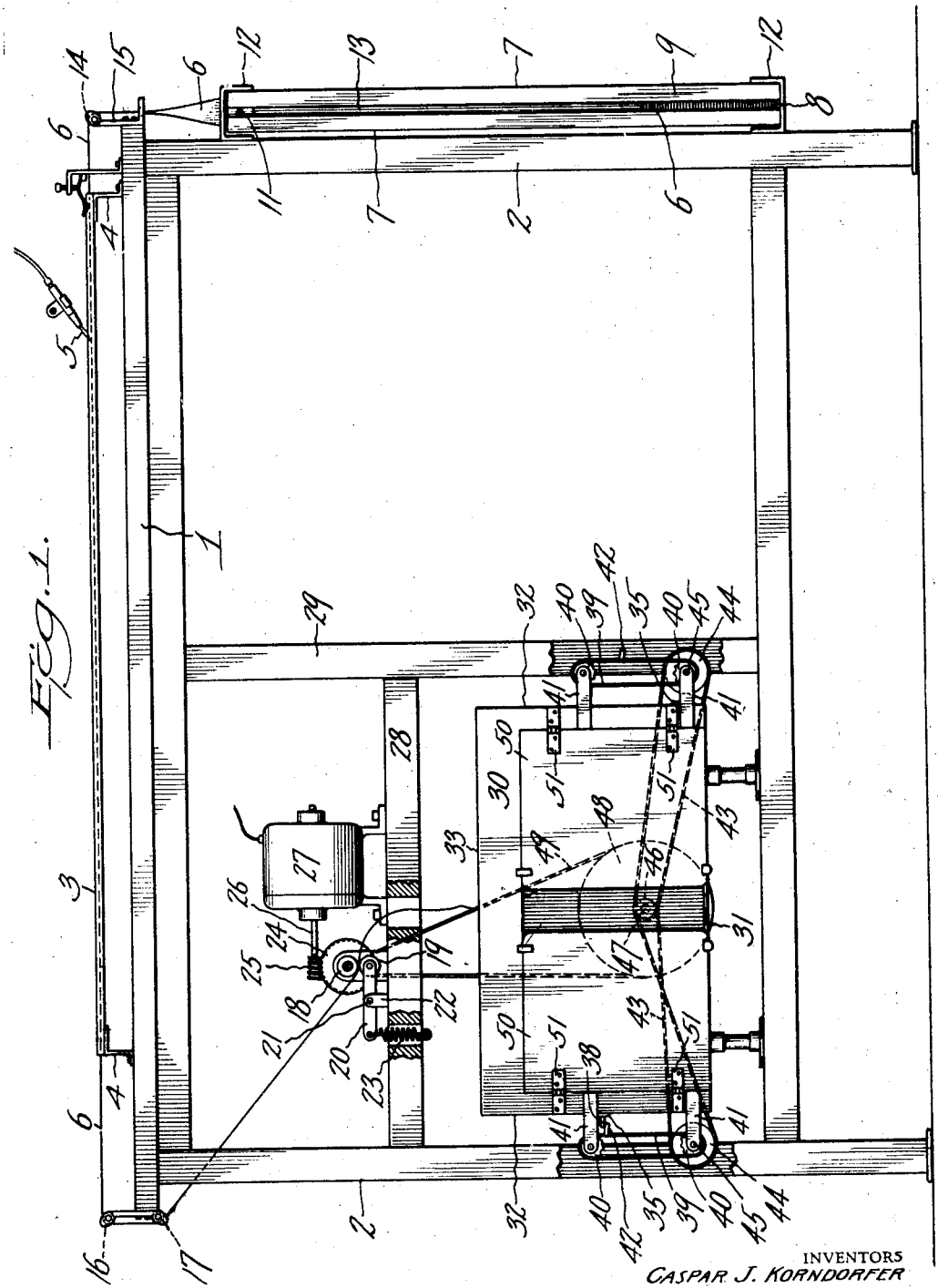

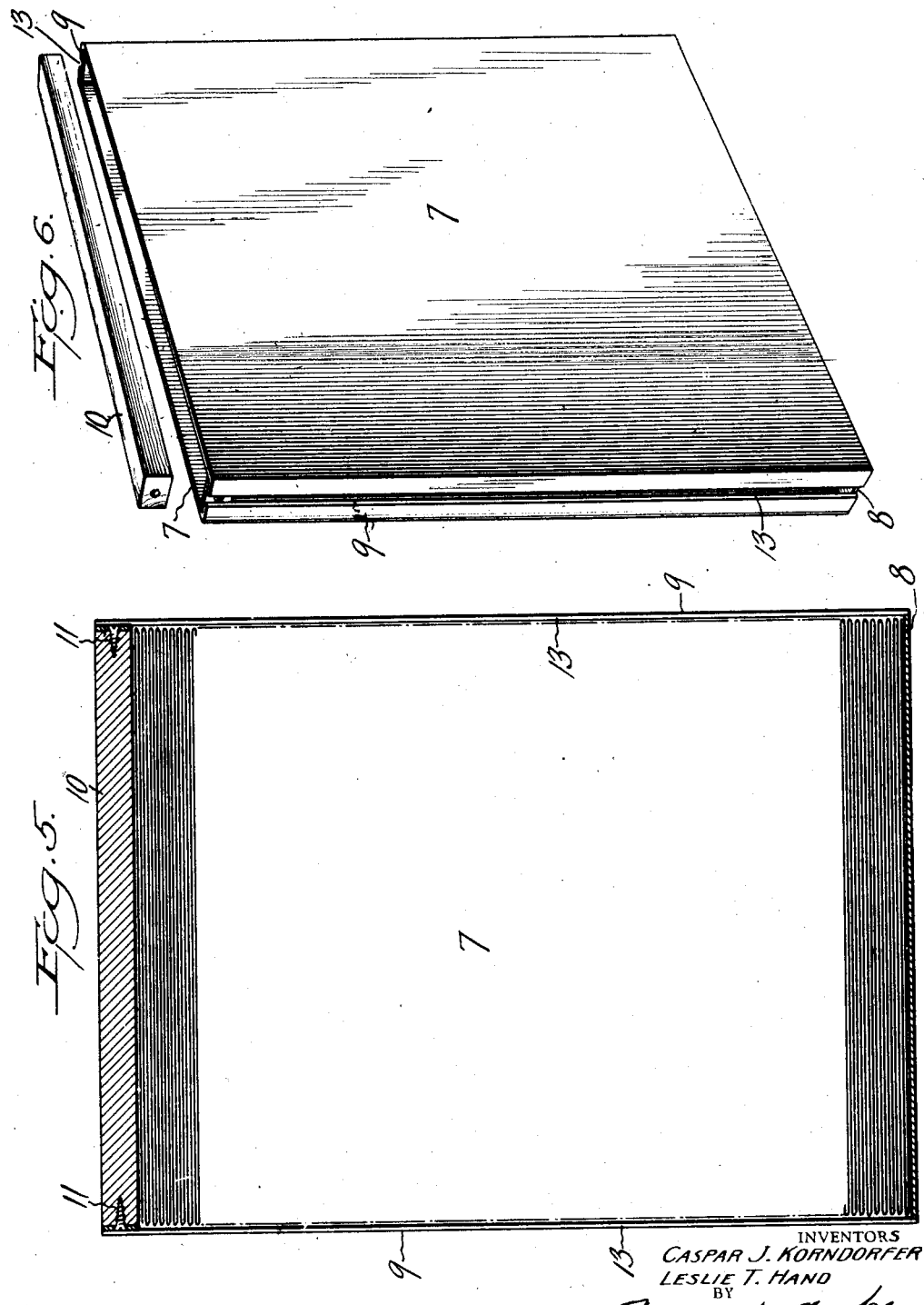

Patented June 25, 1929.

1,718,743

UNITED STATES PATENT OFFICE.

CASPAR J. KORNDORFER, OF ALLENDALE, NEW JERSEY, AND LESLIE T. HAND, OF BROOKLYN, NEW YORK.

PAPER-SUPPLY MEANS FOR RECORDING INSTRUMENTS.

Application filed July 21, 1927. Serial No. 207,339.

This invention relates to paper supply means for recording instruments and our improvements are directed particularly to (1) a novel strip paper supply source; (2) a more convenient mode of delivering paper from the supply source to the recorder, (3) a novel form of receptacle for paper leaving the recorder, (4) a more convenient mode of delivering the record paper to its receptacle and (5) novel means for automatically packing the record paper in small compass within its receptacle.

Our invention has been devised for the purpose of improving the service conditions prevailing in the use of tape with telegraphic recording instruments wherein the present practice is to supply the tape in rolls that are pivotally mounted adjacent the instrument to permit the feed of the tape through the recorder and to a reception roll. The supply of tape thus available is necessarily limited by the diameter of the rolls, which latter require frequent replacements; further the tension applied to prevent loosening of the tape on its roll imposes an undue strain upon the feed mechanism. Also the storing of the record tape in a reception roll prevents the user from making a ready examination of early parts of the record, because the roll must be unwound for inspection purposes, involving loss of time when perhaps a recorded transaction should be checked up quickly, for obvious reasons.

It is the purpose of our invention to avoid the disadvantages above noted, to which end we supply the paper strip or tape in a folded, continuous length of relatively great extent, adapted to feed freely to the instrument without tensional retardation, also we provide a receptacle adapted to receive the record tape in its original folds, and further we provide automatic, gravity presser means to compact the folds of tape in the receptacle, to thereby pack the tape in small compass therein.

Other features and advantages of our invention will hereinafter appear.

In the drawings:

Figure 1 is a front elevation of a recording instrument equipped with our improved paper supply and receiving devices.

Fig. 2 is an enlarged sectional front elevation of the paper receiving device.

Fig. 3 is a horizontal section on the line 3—3 of Fig. 2.

Fig. 4 is a partial end view, much enlarged, of the paper receiving device, showing the gravity operating means for packing the paper therein.

Fig. 5 is a sectional view in front elevation of the paper supply casing, and

Fig. 6 is a perspective elevation of the same.

In said views we have shown a table 1, having the supporting legs 2, said table having a paper support or trackway 3 mounted thereon by means of brackets 4. The usual recording pen 5 is shown as adapted to create markings on a paper strip or tape 6 that is movable over the surface of the support 3. Said pen and paper support may be regarded as representative of a recording instrument, it being unnecessary for the purposes of the present invention to illustrate the pen operating mechanism.

As has been premised the present invention deals with our improved paper or tape supply means and reception means, which will now be explained.

The paper supply means consists of a flat rectangular casing shown in detail in Figs. 5 and 6 as having the parallel sides 7 which are spaced apart only a sufficient width to freely contain the tape 6, which latter lies in a pile of folded plies upon the base 8 of said casing, and is confined therein by the end walls 9. The casing thus formed is of large capacity to contain a quantity of tape equal to that comprised in a number of the rolls now in use. Said casings, when filled, can be closed for shipment by fitting within the upper end thereof a strip of wood or other material such as that indicated at 10, which can be secured in place as by screws 11. Also the same casing can be used for supplying the tape to the recording instrument, and we have shown brackets 12 attached to the legs of the table, at one end thereof, for supporting said casing in position to operatively supply the tape. Before fitting the casing to the table the closure member is removed so that the tape may freely leave said casing. It will be noted that a vertical slot 13 is provided in one end wall 9 of the casing, this slot serving as an observation opening to show when the tape supply is running down and the need for preparing to replace the casing with another one that is fully charged with tape. The tape 6, leaving the supply casing, passes over a roller 14 carried by a bracket 15 that is fixed to the table, and thence passes over the paper support 3 and over rollers 16 and 17 at the other end of the table, continuing therefrom between the feed roller 18 and a roller 19 carried by an arm 20 pivoted at 21 to bracket 22 and tensionally pressed toward the feed roller by a spring 23 to thus establish the frictional engagement constituting the feed. The feed roller 18 carries a worm gear 24 that is engaged by a worm 25 on the shaft 26 of motor 27 whereby the feed is rendered operative.

In the structure illustrated the motor and feed mechanism are shown as supported on a shelf 28 affixed to the table legs and frame members 29 beneath the table top. Below said shelf is positioned our improved receptacle for tape that has received markings from the recording instrument. This receptacle, like the supply casing, is rectangular and flat in shape, having the parallel sides 30, base 31 end walls 32 and top 33, the latter having a central opening 34 for entry of the tape. Since the tape, prior to its being placed in the supply casing, has been folded back and forth with well defined bends at opposite ends of its plies, it is prone on falling into the delivery receptacle to resume therein the same folded condition it had in said supply casing, although it will not naturally retake the same compact state. Therefore we provide means for mechanically packing the folds of tape in said receiving receptacle in order that a large quantity of the tape may be contained therein.

The packing means referred to comprise followers 35, placed one at each end of the receptacle, where they are respectively slidable in a slot 36. Said followers each have an inwardly extending flange 37, and an outwardly projecting detent 38, the flanges 37 being adapted to bear upon the opposite folded ends of the tape to compact said ends and thereby reduce the compass or bulk of the tape filling into the receptacle. The followers are intended to fall upon the tape bends by gravity and to be lifted therefrom intermittently, and means are provided to automatically lift and release said followers periodically. Thus at each end of the receptacle an endless connector 39 is mounted vertically on pulleys 40 that are pivoted in fixed brackets 41, each connector carrying a lug 42 that is adapted to engage and lift a detent 38 as the near reach of the connector moves upwardly, the direction of movement of the connectors being indicated by arrows. It will be appreciated that when a lug 42 passes over the upper pulley in the connector movement, thereby it frees the detent 38, permitting the follower to fall. The connectors 39 are driven by means of other connectors 43 which respectively engage pulleys 44, carried by the shafts 45 that respectively also carry the lower pulleys 40, and said connectors 43 are engaged by pulleys 46 that are carried by a shaft 47 which also carries a pulley 48, said pulley being driven by a belt 49 that engages the roller 19. Hence the motivating power for the follower actuating connectors is derived from the motor 27, through its worm gear operated roller 18 that also effects the tape feed.

The ratio between the pulleys 44, 46, 48 may be such as to permit the followers to fall upon the tape folds at pre-determined intervals suitably related to the delivery of the tape into the receptacle, and the relative positions of the followers upon their connectors at opposite sides of the receptacle may be such as to permit said followers to fall alternately, each compacting operation being preceded by the formation of a fold in the tape to receive compacting pressure.

The receptacle is shown as provided with a pair of doors 50, hinged at 51, so that they may be opened for the removal of a pack of record tape; which pack, by reason of its back and forth folds, permits ready reference to be had to any part thereof.

Variations within the spirit and scope of our invention are equally comprehended in the foregoing disclosure.

We claim:

1. Receiving means for recorded tape having folds leaving a recording instrument comprising a flat rectangular casing whose side walls are spaced apart only sufficiently to freely contain the width of the tape, tape inlet means in the casing top, and vertically slidable means adjacent the casing end walls to compact folds of tape entered within the casing.

2. Receiving means for recorded tape having folds leaving a recording instrument comprising a flat rectangular casing having side walls, end walls, a base and a top, said side walls being spaced apart only sufficiently to freely contain the width of the tape, said top having entry means for the tape and said end walls provided with vertical slots; together with slide members operable in said slots, said members having portions extended into the casing and also portions projected outside the casing, and means co-acting with said outside projected portions to raise said members and permit them to fall to compact the folds of tape entered within the casing.

3. Receiving means for recorded tape having folds comprising a flat rectangular casing having side walls, end walls, a base and a top, said side walls being spaced apart only sufficiently to freely contain the width of the tape, said top having entry means for the tape and said end walls provided with vertical slots, together with slide members operable in said slots, said members having portions extended into the casing and also portions projected outside the casing, means coacting with said outside projected portions to raise said members and permit them to fall to compact the folds of tape entered within the casing, and means for communicating motion to said coacting means for operating them in alternation.

4. Receiving means for recorded tape having folds leaving a recording instrument comprising a flat rectangular casing whose side walls are spaced apart only sufficiently to freely contain the width of the tape, tape inlet means in the casing top, vertically slidable means adjacent the casing end walls to compact folds of tape entered within the casing, and means for operating said slidable means in alternation.

5. In a machine for recording purposes having tape receiving means, supply means comprising a rectangular casing adapted to contain a strip of tape folded and stacked in equal lengths therein, the side walls of said casing being spaced apart only sufficiently to freely contain the width of the tape, said casing having a top opening for egress of the tape, and a wall of said casing having a vertical slot to serve as visual indicating means of the stack height.

6. In a machine for recording purposes having tape receiving means, supply means comprising a rectangular casing adapted to contain a strip of tape folded and stacked in equal lengths therein, the side walls of said casing being spaced apart only sufficiently to freely contain the width of the tape, said casing having a top opening for egress of the tape, removable closure means for said opening, and a wall of said casing having a vertical slot to serve as visual indicating means of the stack height.

New York, July 11, 1927.

CASPAR J. KORNDORFER.
LESLIE T. HAND.